United States Patent
Shiraishi

(10) Patent No.: US 9,500,819 B2
(45) Date of Patent: Nov. 22, 2016

(54) OPTICAL MODULE

(71) Applicant: FUJITSU LIMITED, Kawasaki-shi, Kanagawa (JP)

(72) Inventor: Takashi Shiraishi, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/079,001

(22) Filed: Mar. 23, 2016

(65) Prior Publication Data

US 2016/0313515 A1   Oct. 27, 2016

(30) Foreign Application Priority Data

Apr. 27, 2015   (JP) ................................ 2015-090024

(51) Int. Cl.
| | |
|---|---|
| *G02B 6/30* | (2006.01) |
| *G02B 6/12* | (2006.01) |
| *G02B 6/32* | (2006.01) |
| *G02B 6/42* | (2006.01) |
| *G02B 6/122* | (2006.01) |

(52) U.S. Cl.
CPC ............ *G02B 6/4206* (2013.01); *G02B 6/122* (2013.01); *G02B 6/30* (2013.01); *G02B 6/32* (2013.01); *G02B 6/4214* (2013.01); *G02B 2006/12092* (2013.01)

(58) Field of Classification Search
CPC .......... G02B 6/30; G02B 6/32; G02B 6/122; G02B 6/4206; G02B 6/4214
USPC ............................ 385/14, 24, 40–49, 88, 147
See application file for complete search history.

(56) References Cited

U.S. PATENT DOCUMENTS

| | | | | |
|---|---|---|---|---|
| 5,633,962 | A * | 5/1997 | Kurata ................. | G02B 6/4246 385/14 |
| 6,987,913 | B2 * | 1/2006 | Blauvelt ............ | G02B 6/12002 385/28 |
| 9,316,799 | B2 * | 4/2016 | Shiraishi .................. | G02B 6/42 |
| 2009/0162014 | A1 * | 6/2009 | Shiraishi ............ | G02B 6/29352 385/45 |
| 2010/0303412 | A1 | 12/2010 | Okuno et al. | |
| 2014/0140657 | A1 | 5/2014 | Shiraishi | |

FOREIGN PATENT DOCUMENTS

| | | |
|---|---|---|
| JP | 09-005549 | 1/1997 |
| JP | 2008-046312 | 2/2008 |
| JP | 2011-215547 | 10/2011 |
| JP | 2013-008047 | 1/2013 |
| JP | 2013-057721 | 3/2013 |
| JP | 2014-102399 | 6/2014 |

OTHER PUBLICATIONS

M. Webster et al., "A Statistical Analysis of Conditioned Launch for Gigabit Ethernet Links Using Multimode Fiber", Journal of Lightwave Technology, vol. 17, pp. 1532-1541, (Sep. 9, 1999) (10 pages).

* cited by examiner

*Primary Examiner* — Akm Enayet Ullah
(74) *Attorney, Agent, or Firm* — Fujitsu Patent Center

(57) ABSTRACT

An optical module includes: a light emitting element; an optical waveguide configured to guide light emitted from the light emitting element; and an optical fiber configured to be optically coupled to the optical waveguide, wherein, when an aperture angle of light incident into a core of the optical waveguide is NA1, a core diameter of the optical waveguide is w1, a core diameter of the optical fiber is w2, and a ratio of w1 to w2 is R, an optical system performance index a represented by $a = NA1 \times (w1/w2) = NA1 \times R$ meets a condition of $a<0.15$, and the range of the ratio R meets a condition of $4.38a^2 + 1.63a + 0.16 < R < -13.09a^2 - 1.04a + 0.95$.

14 Claims, 16 Drawing Sheets

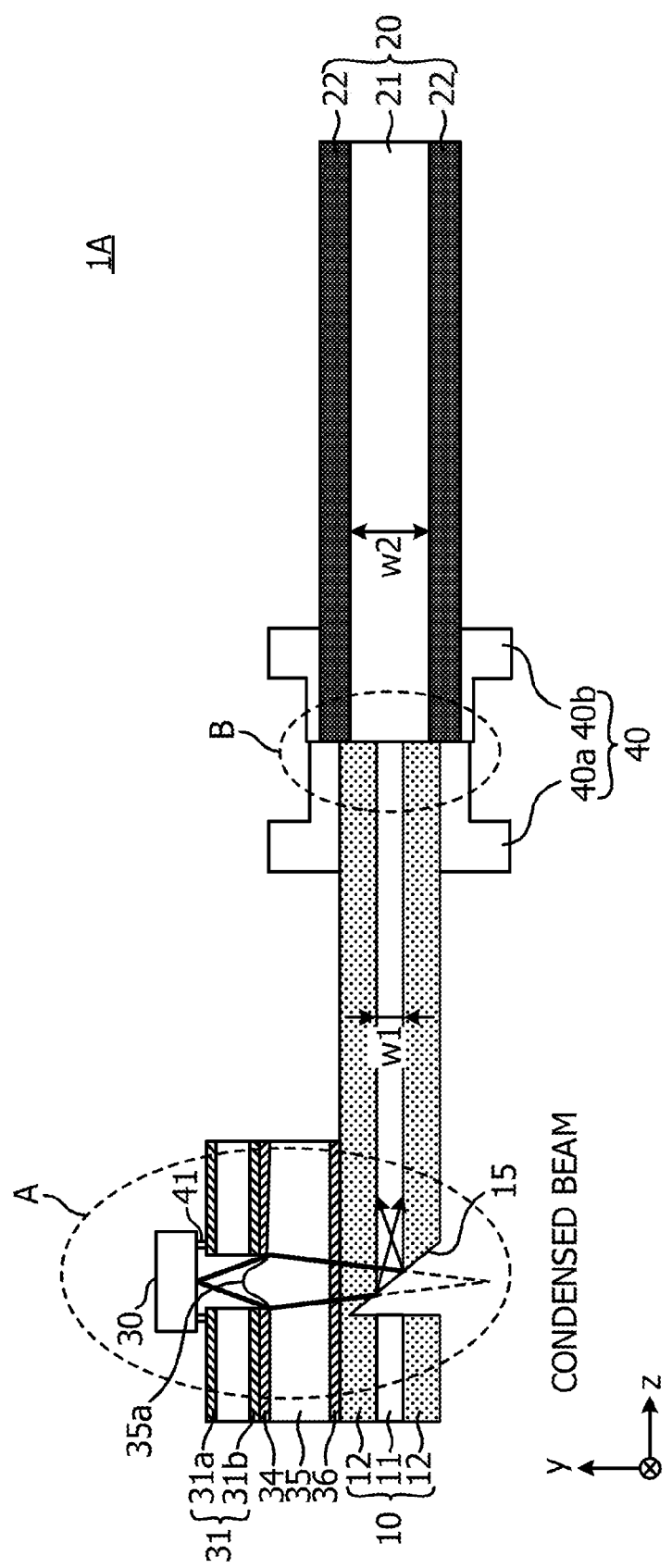

OPTICAL MODULE

CROSS-REFERENCE TO RELATED APPLICATION

This application is based upon and claims the benefit of priority from the prior Japanese Patent Application No. 2015-090024, filed on Apr. 27, 2015, the entire contents of which are incorporated herein by reference.

FIELD

The embodiments discussed herein are related to an optical module.

BACKGROUND

In the field of a server or a high performance computer (HPC), a transmission capacity between a central processing unit (CPU) and an external interface increases by the improvement of performance of a multi-core central processing unit (CPU: an arithmetic processing device).

Related techniques are disclosed in, for example, Japanese Laid-Open Patent Publication Nos. 2014-102399, 2008-046312, and 09-005549, or in, for example, a non-patent document, M. Webster et. al., "A statistical analysis of conditioned launch for gigabit Ethernet links using multimode fiber," Journal of Lightwave Technology, vol. 17, pp1532-1541, (1999).

SUMMARY

According to one aspect of the embodiments, an optical module includes: a light emitting element; an optical waveguide configured to guide light emitted from the light emitting element; and an optical fiber configured to be optically coupled to the optical waveguide, wherein, when an aperture angle of light incident into a core of the optical waveguide is NA1, a core diameter of the optical waveguide is w1, a core diameter of the optical fiber is w2, and a ratio of w1 to w2 is R, an optical system performance index a represented by $a = NA1 \times (w1/w2) = NA1 \times R$ meets a condition of $a < 0.15$, and the range of the ratio R meets a condition of $4.38a^2 + 1.63a + 0.16 < R < -13.09a2 - 1.04a + 0.95$.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

BRIEF DESCRIPTION OF DRAWINGS

FIG. 1 illustrates an exemplary optical module;

FIG. 10 illustrates an exemplary range of a;

FIG. 11 illustrates an exemplary range of a;

DESCRIPTION OF EMBODIMENTS

Figure 2A:
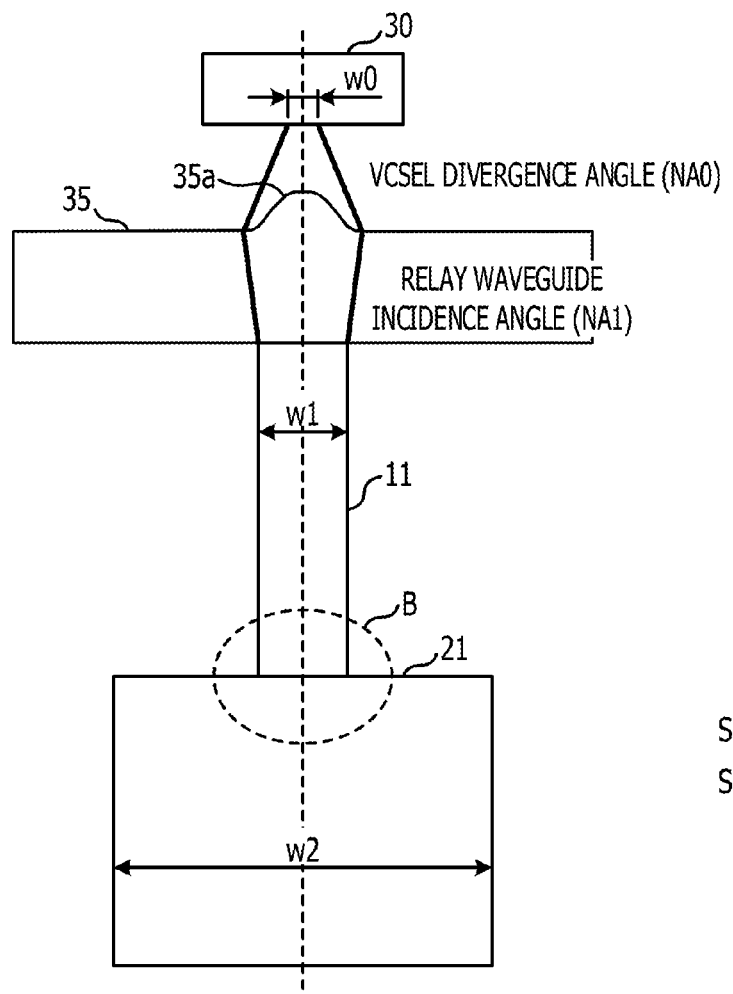
FIGS. 2A and 2B illustrate exemplary optical connection portions.

A high speed transmission of electricity causes problems such as an increased crosstalk or wiring density. Thus, an optical interconnection technique has been provided to realize a high-speed input/output (I/O) using an optical signal. In the optical interconnection technique, an inexpensive optical module may be used with a scale miniaturized to a small fraction in size compared to the long-distance optical communication of a base system. As a candidate of such an optical module, a module in which an optical element such as, for example, a light emitting element or a light receiving element is mounted facing downwardly on a substrate may be used. By using a perforated substrate or a transparent substrate, optical communication is performed between the optical element that is mounted facing downwardly on the substrate and an optical waveguide that is provided on the rear side of the substrate. In order to reduce the cost, an optical module may be used in which a light emitting/receiving element is mounted facing downwardly on a transparent and flexible printed circuit (FPC) board that uses a thin film of, for example, polyimide.

Such an optical module may be used for communication between the racks of a device such as, for example, an HPC, or within the rack, and may have an estimated transmission distance in a range of 100 m to 300 m. In the long-distance optical communication where transmission is performed in the distance of, for example, 1 km to 10 km, a single mode optical fiber and optical device may be used, and in an optical module between devices, a multimode optical fiber and optical device may be used from a viewpoint of reducing costs. Even in the transmission using the multimode optical fiber in a distance of about several hundred meters, since the transmission distance is restricted by wavelength dispersion or mode dispersion as the transmission speed increases, an extended transmission distance is demanded. The transmission distance of the multimode optical fiber depends on a fiber type, and an optical fiber having a graded-index (GI) type refractive index distribution in which the mode dispersion is relatively low may be used. In an OM3 grade GI type optical fiber, transmission may be performed at a transmission speed of 10 Gbps in a distance of about 300 m and at a transmission speed of 25 Gbps in a distance of about 70 m.

For example, in order to reduce an optical connection loss, there may be provided a configuration in which the light output from the optical element mounted facing downwardly is made to be incident into the multimode optical waveguide by a lens sheet and connected from the multimode optical waveguide to the multimode optical fiber. For example, there may be provided a configuration in which vortex-shaped light generated by using a vortex lens is incident into the multimode optical fiber. By generating the vortex-shaped light, the influence of a recessed portion of a refractive index distribution generated around the center of the multimode optical fiber at the time of generating the optical module is reduced, and the mode dispersion is suppressed. For example, there may be provided a method in which, when a signal is connected from the single mode optical device to the multimode optical fiber, single mode light is input to a position offset from the center of the multimode optical fiber. The influence of the recessed portion of the refractive index distribution generated around the center of the multimode optical fiber is mitigated so that the mode dispersion is suppressed. For example, there is provided a configuration in which, in the single mode optical waveguide, the width of a portion of the optical waveguide is narrowed so as to make the portion of the optical waveguide serve as a filter that removes a high-order mode.

The configuration that offsets the incidence position of the light incident into the multimode optical fiber from the center of the multimode optical fiber may be effective in a multimode optical fiber with, for example, an OM1 grade. The generation of the light vortex or the offset of the input position for the improvement of the manufacturing quality or the inspection quality may not be effective in a multimode optical fiber such as an OM3 grade optical fiber and an OM4 grade optical fiber in view of the improvement of the transmission characteristic.

For the optical transmission, in a connection type of connecting an optical signal from a single mode optical device to a multimode optical fiber which is defined as 10 GbE-LR4 as a standard, there is provided a connection type in which the multimode optical device and the multimode optical fiber are connected to each other which is defined as a standard such as, for example, 10 GbE-SR4 or 100 GbE-SR4, by the improvement of the quality of multimode optical devices. The demand for using a connection type of connecting a multimode optical waveguide and a multimode optical fiber to each other is increasing.

In the connection type of connecting a multimode optical waveguide and a multimode optical fiber to each other, it may be difficult to control the optical modes of hundreds of lights existing in a multimode optical waveguide, with the vortex lens or filter out all of the high-order mode components. An optical loss may occur in the method of filtering the high-order mode components. For example, the improvement in a transmission characteristic by suppressing the mode dispersion may depend on the grade of the multimode optical fiber.

FIG. 1 illustrates an exemplary optical module. FIG. 1 represents a schematic cross sectional view of an optical module 1A. The optical module 1A includes a light emitting element 30, an optical waveguide 10 into which light emitted from the light emitting element 30 is incident, and an optical fiber 20 which is optically connected to the optical waveguide 10. The optical waveguide 10 and the optical fiber 20 are connected to each other by, for example, an optical connector 40. Since the optical waveguide 10 relays light between the light emitting element 30 and the optical fiber 20, it may be referred to as a "relay waveguide."

The light emitting element 30 may be, for example, a vertical cavity surface emitting laser (VCSEL), which is a multimode optical device. The light emitting element 30 is mounted on an electric circuit board 31 in a flip-chip type by a terminal 41. The electric circuit board 31 is, for example, a flexible printed circuit (FPC) board having a thickness of about 100 µm and may be hereinafter referred to as a "flexible board 31." The flexible board 31 includes a signal electrode film 31a formed at a certain location thereof, and a ground electrode film 31b formed on the rear side thereof. The light emitted from the light emitting element 30 is condensed by a lens 35a formed in a lens sheet 35 and guided to the optical waveguide 10. The lens sheet 35 is a film having a thickness of, for example, 100 µm. The lens 35a is imprinted on one side of the lens sheet 35a. The lens sheet 35 is fixed between the flexible substrate 31 and the optical waveguide 10 by adhesive layers 34 and 36.

The optical waveguide 10 is, for example, a polymer waveguide and has a core 11 surrounded by a clad 12. The cross-sectional shape of the core 11 in the plane (the xy plane) orthogonal to the light propagation direction (the z direction) is, for example, a square in which the length of each side is w1. The length w1 may be set as a core diameter of the optical waveguide 10. The light condensed by the lens 35a is reflected on a mirror 15 formed on the rear side of the optical waveguide 10 and is incident into the core 11.

The optical fiber 20 is a multimode optical fiber and has a core 21 surrounded by a clad 22. The diameter of the core 21 is w2 (w2>w1).

By optimizing the configuration of the optical connection part A connecting the light emitting element 30 to the optical waveguide 10 and the configuration of the optical connection part B connecting the optical waveguide 10 to the optical fiber 20, the mode dispersion in the optical fiber 20 is reduced so that the transmission characteristic may be improved.

Figure 2B:
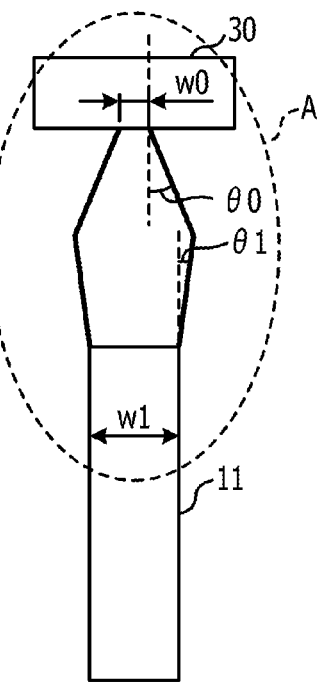

FIGS. 2A and 2B illustrate exemplary optical connection portions. FIGS. 2A and 2B represent the optical connection parts A and B of FIG. 1. In the optical connection part A, the light emission diameter of the light emitting element 30 is w0, the aperture angle of the emitted light is NA0, and the aperture angle of the light incident into the core 11 of the optical waveguide 10 is NA1. For convenience, the aperture angle NA0 of the emitted light is referred to as a "divergence angle NA0," and the aperture angle NA1 of the incident light is referred to as an "incidence angle NA1." The divergence angle NA0 and the incidence angle NA1 are values that depend on an angle of a light beam and are represented by $NA0 = n \times \sin\theta_0$ and $NA1 = n \times \sin\theta_1$, respectively. Here, $\theta_0$ is the angle of the light emitted from the light emitting element 30 based on the normal line, $\theta_1$ is the angle of the light incident on the optical waveguide 10 based on the normal line, and n is a relative refractive index of a medium in which the emitted light and the incident light propagate. When an air layer is interposed between the optical waveguide 10 and the lens sheet 35, the light emitted from the light emitting element 30 and the light incident into the optical waveguide 10 propagate in the air. Since the relative refractive ratio of the air is close to 1, each of the divergence angle NA0 and the incidence angle NA1 is represented as follows:

$$NA0 = n \times \sin\theta_0$$

$$NA1 = n \times \sin\theta_1 \tag{1}$$

In the optical connection part B, the ratio R of the core diameter w1 of the optical waveguide 10 to the core diameter w2 of the optical fiber 20 is w1/w2 (R=w1/w2).

By using the incidence angle into the core 11 NA1 and the ratio R, the optical system performance index a of the optical module 1A is defined as follows:

$$a = NA1 \times R = NA1 \times (w1/w2) \tag{2}$$

When the optical system performance index a and the ratio R of the core diameters are set to optimal ranges by, for example, a simulation, the transmission characteristic of the optical module 1A may be improved.

The optical module 1A may be designed such that a meets, for example, a<0.15, and R (i.e., w1/w2) meets, for example, $4.38a^2+1.63a+0.16<R<-13.09a^2-1.04a+0.95$.

As the angle of the beam propagating in the optical waveguide 10 becomes large, higher-order mode light propagates. In consideration of only the propagation characteristic, it is desirable that the incidence angle NA1 into the core 11 becomes relatively small. The incidence angle NA1 and the beam diameter (spot size) of the light incident into the core 11 are in a trade-off relationship. In FIGS. 2A and 2B, when NA1 is made to be overly small by changing the curvature of the lens 35a, the beam diameter of the condensed beam increases, and the beam leaks from the core 11 thereby causing a loss. Meanwhile, when NA1 is made to be relatively large in order to reduce the spot size, the high-order mode components increase. The spot size of the beam incident into the core 11 may be a size that reduces the high-order mode components and the optical loss, for example, to minimum values.

For example, when the lens 35a is designed to treat multimode beams as an aggregate of random light beams and cause a lens system having a w1/w0 magnification to project an optical image of the light emitting element 30 into the optical waveguide 10, the beams are capable of being condensed to the optical waveguide 10 in a good excited state while minimizing the optical loss.

As illustrated in FIGS. 2A and 2B, when there is provided only one lens 35, the lens 35a is designed such that the incidence angle NA1 of the light emitted from the lens 35a to be incident into the core 11 of the optical waveguide 10 becomes as follows:

$$NA1=NA0\times(w0/w1) \quad (3)$$

For example, the incidence angle NA1 is designed to be relatively small such that the spot size of the light input to the optical waveguide 10 increases to the maximum that does not cause the optical loss. The spot size of the light incident into the optical waveguide 10 increases, for example, to the extent that the spot size becomes identical to the core diameter w1.

Figure 3A:
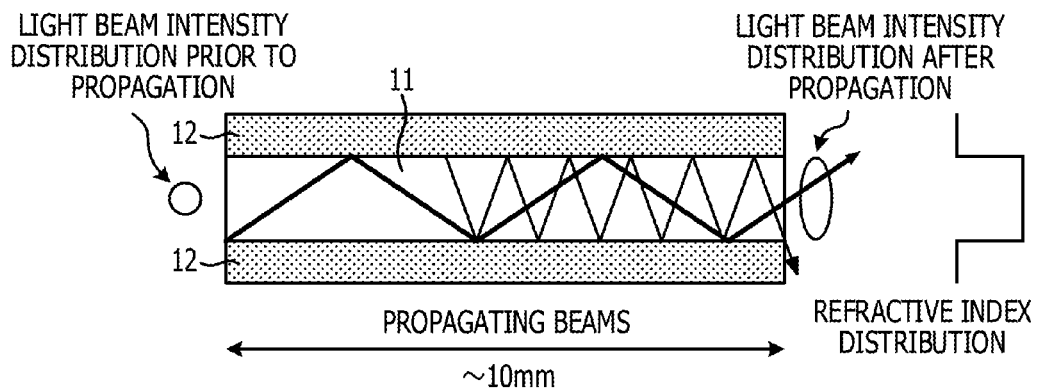
FIGS. 3A and 3B illustrate exemplary light propagation in a step index type optical waveguide.
Figure 3B:
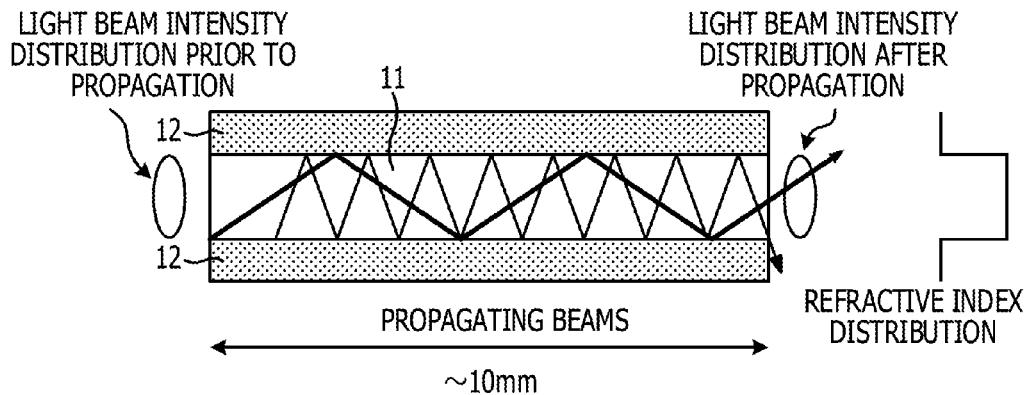
Figure 4A:
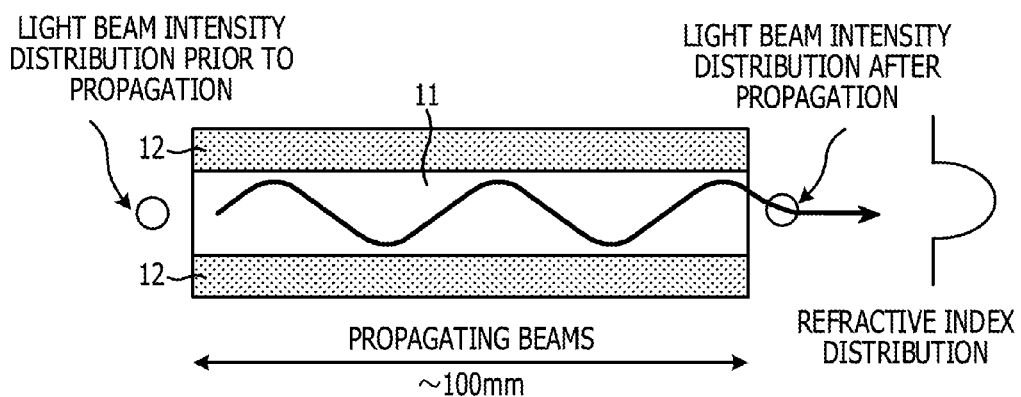
FIGS. 4A and 4B illustrate exemplary light propagation in a graded index type optical waveguide.
Figure 4B:
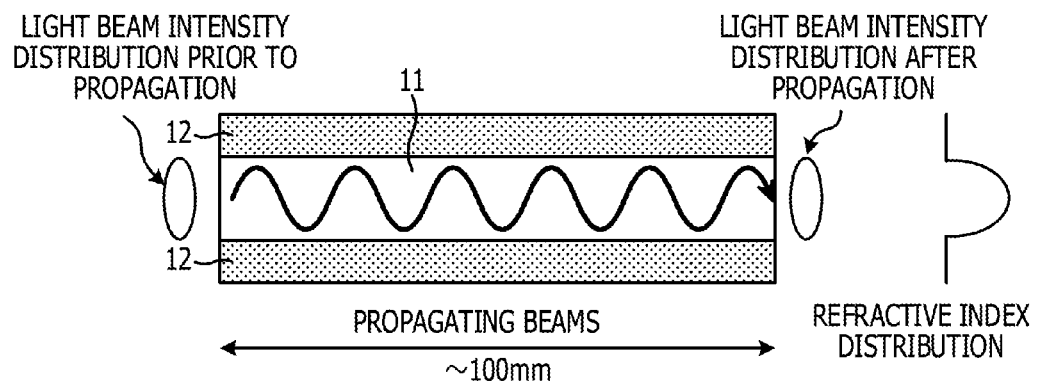

FIGS. 3A and 3B illustrate exemplary light propagation in a step index type optical waveguide. FIG. 3A represents light propagation in a waveguide having a step index type refractive index distribution when the spot size of the incident light is relatively small. FIG. 3B represents light propagation in a waveguide having a step index type refractive index distribution when the spot size of the incident light is relatively large. FIGS. 4A and 4B illustrate exemplary light propagation in a graded index type optical waveguide. FIG. 4A represents light propagation in a waveguide having a graded index (GI) type refractive index distribution when the spot size of the incident light is relatively small. FIG. 4B represents light propagation in a waveguide having a graded index (GI) type refractive index distribution when the spot size of the incident light is relatively large. In the present exemplary embodiment, the optical waveguide 10 is a multimode waveguide having a step index type refractive index distribution, and the optical fiber 20 is a GI type optical fiber.

As illustrated in FIGS. 3A and 3B, in the optical waveguide 10 having the step index type refractive index distribution, the angle of the light beam is also maintained after the light beam exits from the optical waveguide 10 when the length of the optical waveguide is relatively short (e.g., 30 mm or less), regardless of the spot size of the light beam to be input. This indicates that, for example, a connection to a new high-order mode hardly occurs in the light propagating in the optical waveguide 10. The beam incident into the core 11 of the optical waveguide 10 at the aperture angle NA1 is incident into the core 21 of the optical fiber 20 at the aperture angle NA1.

With respect to the intensity distribution of the light beam, in the step index type optical waveguide 10, the intensity distribution remains the same after the propagation even with a relatively short propagation distance of about 10 mm. Regardless of the spot size of the light incident into the core 11 of the optical waveguide 10, the optical intensity distribution after the propagation in the optical waveguide 10 becomes substantially the same as the core diameter w1 of the optical waveguide 10. From this point as well, NA1 may be made to be relatively small, and the spot size of the light incident into the optical waveguide 10 may be controlled to a marginal value at which the optical loss is not caused.

The optical fiber 20 is longer than the optical waveguide 10 and is about 100 m in length. In the light propagating in a relatively long multimode optical fiber, the beam diameter may become substantially the same as the core size of the optical fiber after the propagation even if the spot size at the input time is relatively small. For example, as illustrated in FIGS. 4A and 4B, when the quality-improved GI type optical fiber 20 (e.g., the OM3 grade optical fiber or the OM4 grade optical fiber) is used, the beam diameter may not be widened to that extent. When light is input into the vicinity of the center of the multimode optical fiber 20, the intensity distribution of the input light may be maintained even after the propagation. In contrast, in the step index type optical waveguide 10, the optical intensity distribution is widened to the core diameter w1 even in a relatively short propagation distance.

This difference may be derived from two reasons. As one reason, for example, in the case of the GI type optical fiber 20, since the refractive index decreases toward the periphery of the core 21, the light beam input into the vicinity of the center of the core 21 is bent and propagated as illustrated in FIGS. 4A and 4B.

Figure 5:
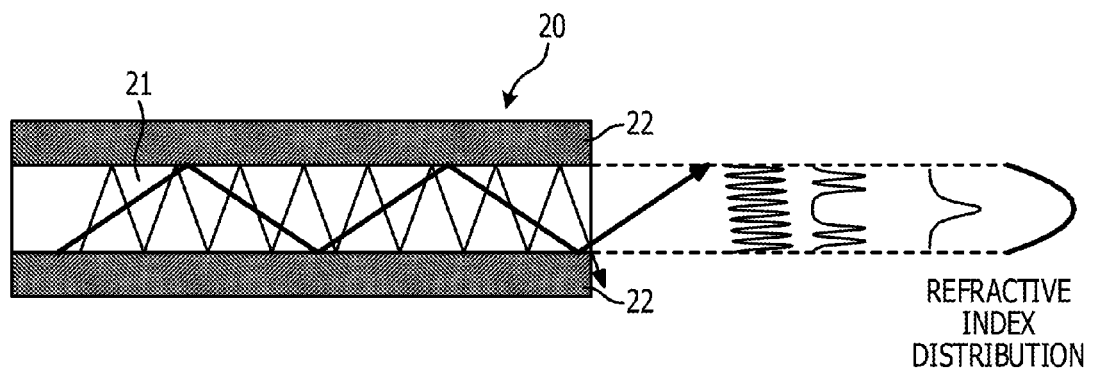
FIG. 5 illustrates an exemplary high-order mode component in a multimode optical fiber.

FIG. 5 illustrates an exemplary high-order mode component in the multimode optical fiber. As illustrated in FIG. 5, in the multimode optical fiber 20, the optical intensity distribution tends to be spread throughout the core 21 as the high-order components increase. Low-order mode light has relatively short and fast propagation distance and is concentrated in the center of the core 21 in space. High-order mode light has relatively long and slow propagation distance and is concentrated in the periphery of the core 21 in space. As the refractive index distribution within the core 21 is graded (with gradient), the propagation speed of the high-order mode component becomes relatively fast in the periphery of the core 21, and the propagation speed of the low-mode component becomes relatively slow in the center of the core 21. Therefore, the difference in the propagation time caused by different modes may be solved. Irregularities are generated in the vicinity of the interface between the core 21 and the clad 22 when the optical fiber 20 is manufactured. Therefore, when the light beam propagates in the vicinity of the interface between the core 21 and the clad 22, the generation of the high-order mode may be suppressed.

The other reason is that the recessed portion of the refractive index distribution, which has occurred in the vicinity of the center of the core 21, is removed due to the improvement of the quality of the G1 type optical fiber 20, and the light input into the vicinity of the center is no longer affected by the recessed portion of the refractive index distribution.

Based on these two reasons discussed above, when a light beam is incident into the vicinity of the center of the GI type optical fiber 20 in a relatively small spot size compared to the diameter of the core 21, the propagation may be performed without causing the optical intensity distribution to be spread as much. Since the spreading of the optical intensity distribution of the light beam that is propagating in the optical fiber 20 is suppressed, the influence of the mode dispersion may be reduced.

Since the relationship between the spreading w3 of the light beam with respect to the core diameter w2 of the optical fiber 20 and a mode dispersion amount MD varies depending on, for example, a slight difference of the refractive index distribution of the optical fiber 20, it may not be represented by a uniform relationship. For simplicity, the mode dispersion amount MD and w3/w2 may be treated to be proportional to each other.

$$MD \propto w3/w2 \qquad (4)$$

The mode dispersion amount is reduced by reducing the spreading of the beam in the optical fiber 20 (i.e., the beam diameter of w3).

For example, there may be an advantage when the optical waveguide 10 becomes a waveguide having the step index type refractive index distribution. The mode dispersion amount of the propagating light is smaller in the GI type waveguide side (e.g., FIGS. 4A and 4B) than in the step index type waveguide. For example, in the GI type waveguide used in the optical fiber 20, the light confinement effect is relatively low in the periphery of the core 21. This is because the difference in the refractive index between the core 21 and the clad 22 becomes relatively small in the periphery of the core 21. Hence, the connection loss may occur when the light is not incident into the center of the core 21. In the step index type optical waveguide 10, since the light confinement effect does not change regardless of the portion of the core 11 where the light is incident into, the connection loss may be substantially the same. Since the length of the optical waveguide 10 is about 10 mm to 20 mm, the influence of the mode dispersion may be small inside the optical waveguide 10. As one of the characteristics of the step index type waveguide, the optical intensity distribution is spread to the core diameter w1 at the exit of the optical waveguide 10 and the state of the optical spot on the incidence surface of the optical fiber 20 becomes substantially the same, regardless of the spot size of the light input into the optical waveguide 10. Hence, an input to the center of the core 11 by reducing the spot size of the light input to the optical waveguide 10 may not be performed.

The light emitted from the optical waveguide 10 may be incident into the vicinity of the center of the GI type optical fiber 20 in a relatively small spot size, compared to the core diameter of the optical fiber 20. The connection loss may be reduced by highly accurately positioning the core 11 of the optical waveguide 10 and the core 21 of the optical fiber 20 by using the optical connector 40 as illustrated in FIG. 1. As the optical connector 40, for example, a polymer-mechanical transfer (PMT) optical connector 40a for a polymer waveguide may be used at the optical waveguide 10 side, and for example, a mechanical transfer (MT) optical connector 40b may be used at the optical fiber 20 side.

In order to reduce the mode dispersion in the optical module 1A that uses the optical waveguide 10 having the step index type refractive index distribution and the GI type optical fiber 20, the incidence angle NA1 toward the optical waveguide 10, the core diameter w1 of the optical waveguide 10, and the core diameter w2 of the optical fiber 20 may be set to appropriate ranges.

The optical system performance index a of the optical module 1A is defined by Equation (2).

$$a = NA1 \times R = NA1 \times (w1/w2) \qquad (2)$$

Physically, a is a value that is determined by the aperture angle NA1 of the beam incident into the core 11 of the optical waveguide 10 and the ratio of the core diameters of the optical waveguide 10 and the optical fiber 20. As NA1 and w1/w2 are small, the mode dispersion amount becomes relatively small, and the propagation characteristic becomes excellent. Accordingly, the propagation characteristic becomes excellent when the value of a becomes also relatively small. The core diameter w2 may be a fixed value in the multimode optical fiber, and the core diameter w2 of the optical fiber 20 is set to 50 μm.

When w1 is reduced in order to reduce a, NA1 in Equation (3), for example, NA1=NA0×(w0/w1) increases so that a may not be freely reduced. When Equation (3) is substituted into Equation (2), the following Equation (5) is obtained:

$$a = NA0 \times (w0/w1) \times (w1/w2) = NA0 \times w0/w2 \qquad (5)$$

Since the core diameter w2 of the optical fiber 20 is fixed, a is set to an appropriate value by adjusting the divergence angle NA0 and the light emission diameter w0.

The proper ranges for a and w1/w2 may be obtained by optically connecting the multimode optical waveguide 10 and the multimode optical fiber 20 to each other and performing analysis of propagating modes.

Figure 6A:
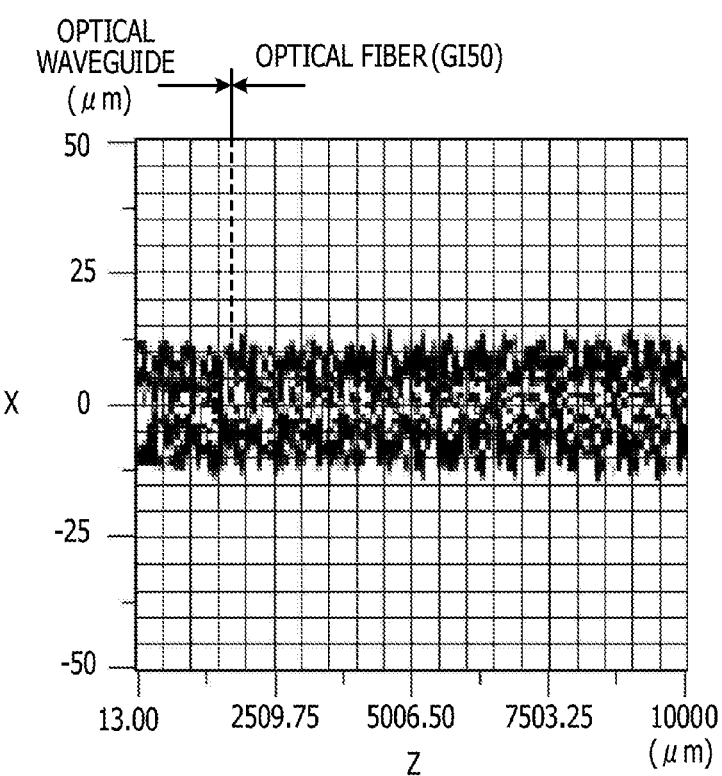
FIGS. 6A and 6B illustrate an exemplary simulation of multimode beam propagation.
Figure 6B:
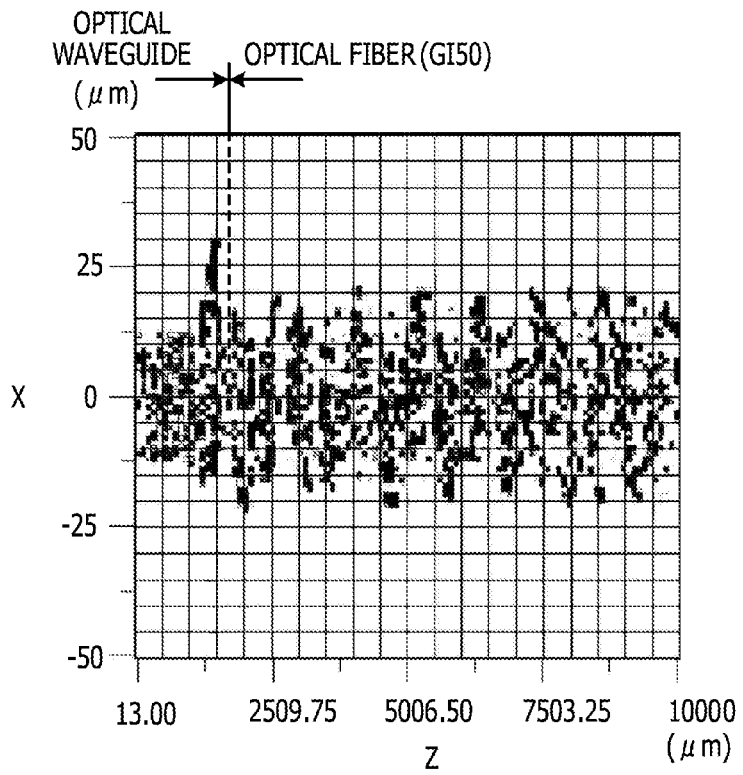

FIGS. 6A and 6B illustrate an exemplary simulation of multimode beam propagation. FIGS. 6A and 6B represent an intensity distribution of propagating light as an exemplary simulation. The horizontal axes represent a position in the optical axis direction (the z direction), and the vertical axes represent a position in the width direction (the x direction) of the optical waveguide based on the optical axis. In the simulation, a beam propagation method (BPM) may be used. Light is connected form the optical waveguide 10 having the core diameter w1 of 25 μm and the length of 20 mm into the optical fiber 20 having the core diameter w2 of 50 μm in order to propagate in the optical fiber 20. As illustrated in FIG. 6A, when a is relatively small, for example, in the case where a<0.15, the optical intensity distribution remains narrow even after the light is connected into and propagates in the optical fiber 20. As illustrated in FIG. 6B, when a is relatively large, for example, in the case where a>0.15, the optical intensity distribution is spread after the light is connected into the optical fiber 20 so that the propagation characteristic may be deteriorated.

Figure 7:
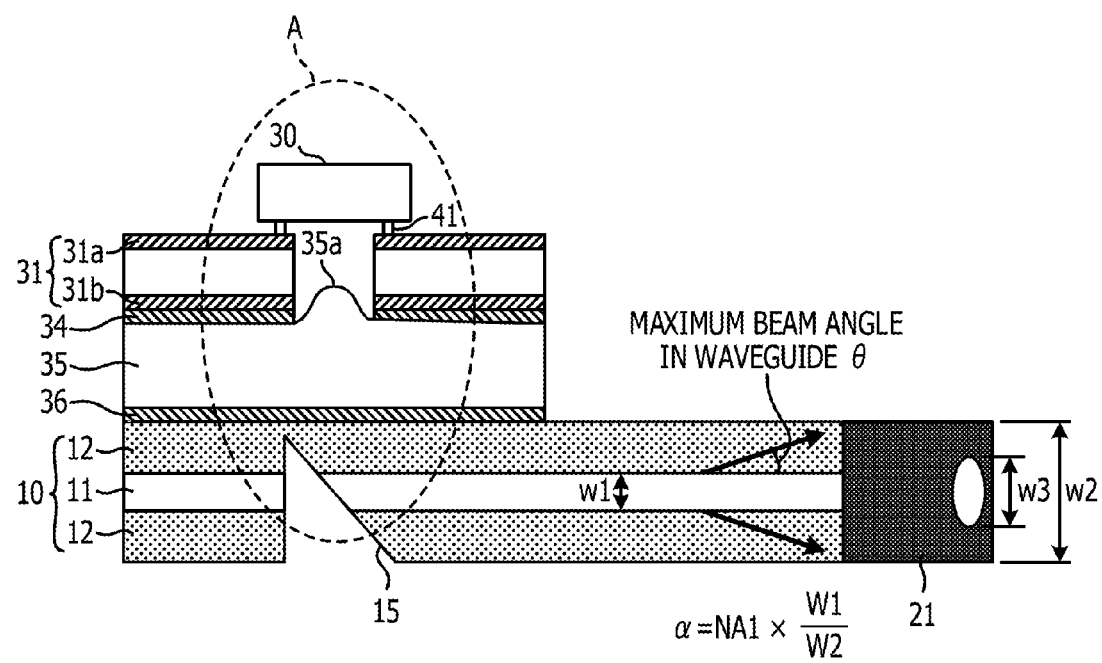
FIG. 7 illustrates an exemplary configuration of a transmission line.

FIG. 7 illustrates an exemplary configuration of a transmission line. FIG. 7 represents the configuration of the optical module for the simulation of FIGS. 6A and 6B. As the configuration for the simulation, the same or similar configuration as or to, for example, FIG. 1 may be used. The beam diameter after the incidence on the core 21 of the optical fiber 20 is w3. As in FIGS. 3A and 3B, the maximum beam angle θ of the light exiting from the optical waveguide 10 may be equal to the beam angle at the entrance side of the optical waveguide 10. Accordingly, θ is represented by Equation (6).

$$\theta = \sin^{-1}(NA1) \qquad (6)$$

Figure 8:
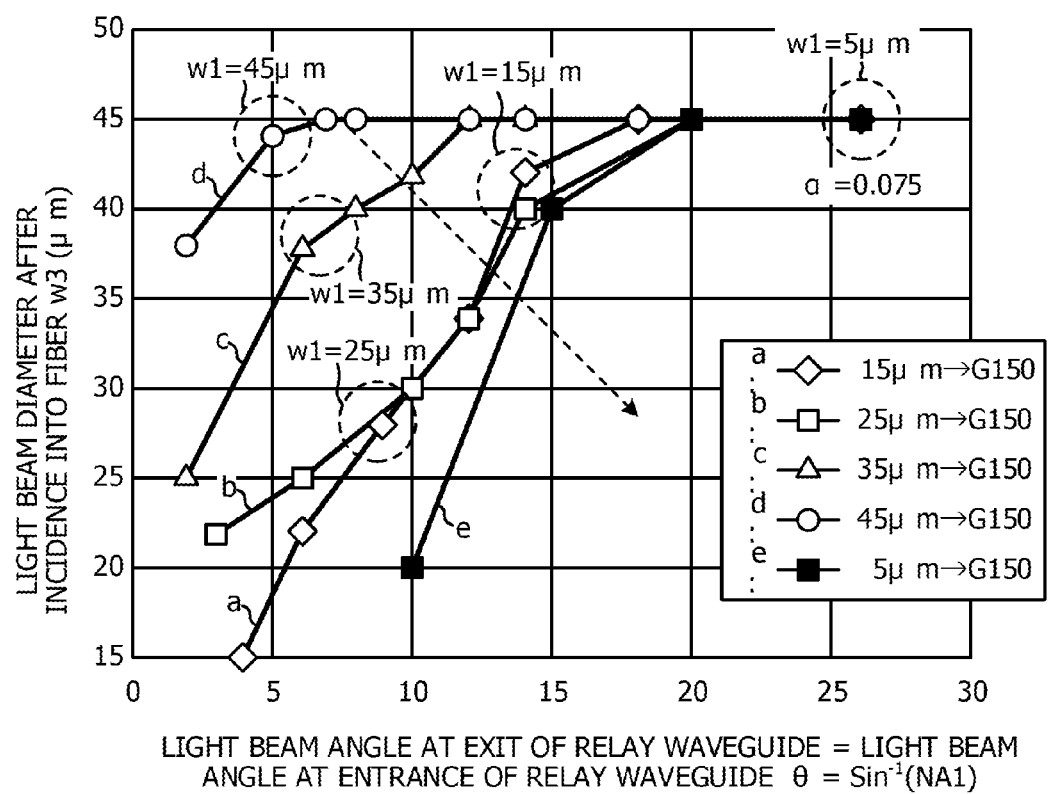
FIG. 8 illustrates an exemplary analysis result of a light beam diameter w3.

FIG. 8 illustrates an exemplary analysis result of the light beam diameter w3. FIG. 8 represents a relationship between the beam angle θ at the exit of the optical waveguide 10 and the beam diameter w3 after the light is incident into the optical fiber 20. The optical fiber 20 may be a GI50 fiber, and the core diameter w2 is fixed to 50 μm. The analysis may be conducted while changing the core diameter w1 from 5 μm to 45 μm. As the core diameter w1 of the optical waveguide 10 is reduced, w3 is reduced. As the beam angle θ at the exit of the optical waveguide 10 is reduced, w3 is reduced.

Since the beam angle θ at the exit of the optical waveguide 10 is almost the same as the beam angle at the entrance of the optical waveguide 10 represented by Equation (6), w3 depends on the value of a (a=NA1×w1/w2). The locations indicated by the dashed line circles in FIG. 8 represent the cases in which a is equal to 0.075 (a=0.075) at each core diameter w1. When the core diameter w1 of the optical waveguide 10 is overly reduced, w3 increases on the contrary since NA1 increases (see Equation (3)). Accordingly, w1 may fall within a proper range that does not increase w3. As illustrated in FIG. 8, when a is made to be constant (e.g., a=0.075), the beam diameter w3 of the light propagating in the optical fiber 20 becomes the smallest when the core diameter w1 of the optical waveguide 10 is 25 μm.

Figure 9:
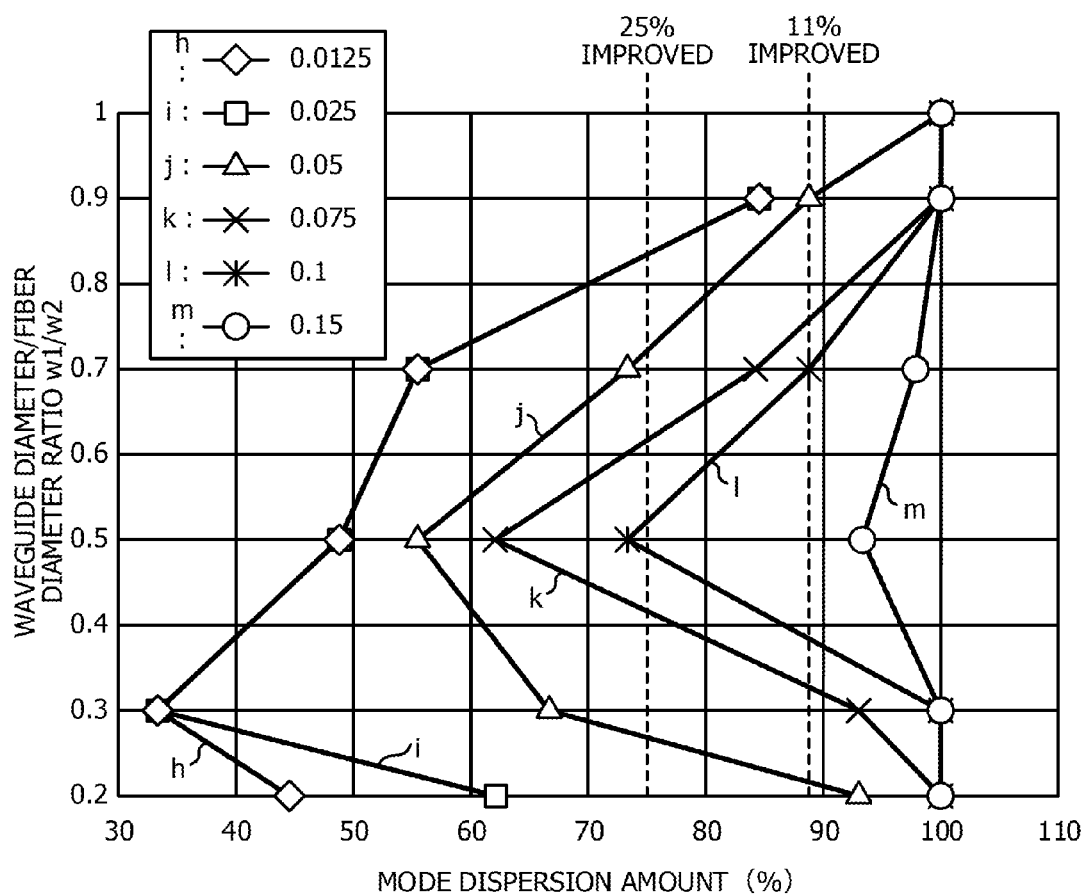
FIG. 9 illustrates an exemplary range of a propagation characteristic.

FIG. 9 illustrates an exemplary range of the propagation characteristic. The range represented in FIG. 9 may be a proper range. The horizontal axis represents the mode dispersion amount by a percentage obtained by multiplying Equation (4) by 100. The vertical axis represents the ratio R (R=w1/w2) of the core diameters between the optical waveguide 10 and the optical fiber 20. The relationship between the ratio R and the mode dispersion amount MD is analyzed for each of the different values of a.

When a is overly large (a>0.15), the mode dispersion suppression effect is relatively small. When a is made to be smaller than 0.15 (a<0.15) so that a is reduced to 0.05, the mode dispersion amount becomes minimum at R=0.5. When a is further reduced, R at which the mode dispersion amount becomes minimum shifts to R<0.5.

Figure 10:
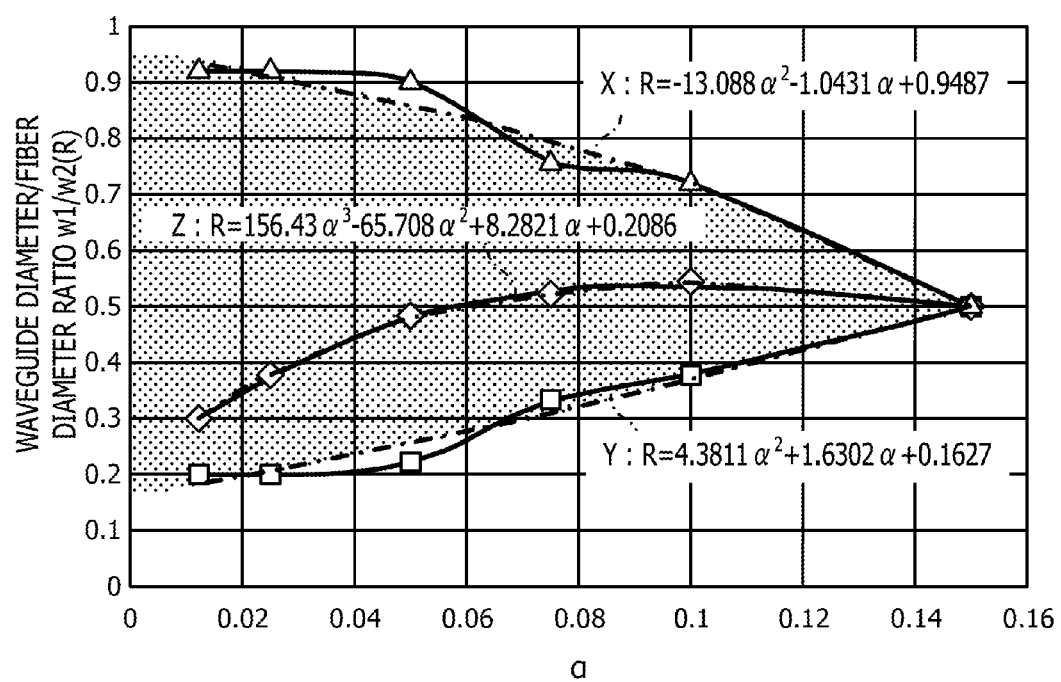
Figure 11:
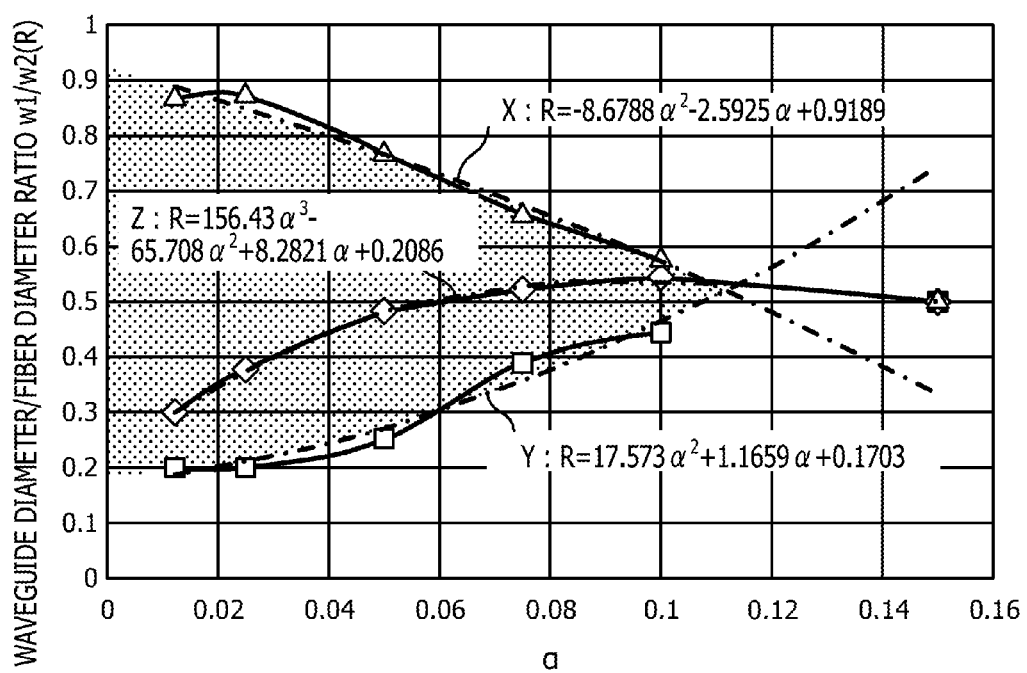

FIG. 10 illustrates an exemplary range of a. FIG. 10 represents ranges for a and R when the mode dispersion amount is improved by 11% in FIG. 9. FIG. 11 illustrates an exemplary range of a. FIG. 11 represents ranges for a and R when the mode dispersion amount is improved by 25% in FIG. 9. In FIGS. 10 and 11, the horizontal axes represent a(a=NA1×w1/w2), and the vertical axes represent R (R=w1/w2). The shaded ranges may be the ranges that are effective in the reduction of the mode dispersion.

Each of the lines X, Y, and Z in FIG. 10 represents a value of R by the function of a. The line X indicates an approximate curve representing an upper limit for R that is effective in the reduction of the mode dispersion. The line Y indicates an approximate curve representing a lower limit for R that is effective in the reduction of the mode dispersion. From the analyzed result, when a<0.15 is met, and R meets $4.3811a^2+1.6302a+0.1627<R<-13.088a^2-1.043a+0.9487$, the mode dispersion is reduced. This equation is rounded to two decimal places as follows: $4.38a^2+1.63a+0.16<R<-13.09a^2-1.04a+0.95$.

The middle line Z represents a value of R in the case where the mode dispersion is most largely reduced for each of the values of a, and the value of R is approximated to $R=156.43a^3-65.708a^2+8.2821a+0.2086$. This equation is rounded to two decimal places as follows: $R=156.43a^3-65.71a^2+8.28a+0.21$. The range of ±0.01 from the value of R may be a desired value of R.

FIG. 11 illustrates an exemplary range of a. FIG. 11 represents a range in which the mode dispersion is further reduced. When a<0.11 is met, and R meets $17.573a^2+1.1659a+0.1703<R<-8.6788a^2-2.5925a+0.9189$, the mode dispersion may be further reduced. This equation is rounded to two decimal places as follows: $17.57a^2+1.166a+0.17<R<-8.68a^2-2.59a+0.92$.

The middle line Z represents a value of R in the case where the mode dispersion is most largely reduced for each of the values of a, and the value of R is as follows: $R=156.43a^3-65.71a^2+8.28a+0.21\pm0.01$ as in FIG. 10.

With the above analysis, the lens 35a is designed such that the incidence angle NA1 toward the core 11 of the optical waveguide 10 meets Equation (3) (e.g., NA1=NA0×w0/w1). The refractive index difference between the core and the clad of each of the optical waveguide 10 and the optical fiber 20 (which may be represented by the numeral aperture NA) may be arbitrary. For example, a glass fiber having NA=0.2 and the core diameter of 50 μm may be used as the optical fiber 20. For example, a step index type polymer waveguide having NA=0.3 may be used as the optical waveguide 10. Almost the same result may also be obtained when a polymer waveguide having NA=0.25 is used. This is because the optical waveguide 10 has a short length of 10 mm to 100 mm, and for example, because a connection of modes hardly occurs in the polymer waveguide. The refractive index difference of the optical waveguide 10 may be equal to or larger than the refractive index difference of a VCSEL used as the light emitting element 30.

From the viewpoint of reducing the mode dispersion, an upper limit for the value of a may be set (e.g., a<0.15), and a may be set to be as small as possible (e.g., a<0.11). From the viewpoint of manufacture, a lower limit of a may be set. The core diameter w2 of the optical fiber 20 may be 50 μm and may be a fixed value. Where the aperture angle NA1 of the light incident into the core 11 of the optical waveguide 10 is constant, a is reduced as the core diameter w1 of the optical waveguide 10 is reduced. In the case of, for example, the polymer waveguide, the core is formed by exposure and development. Thus, w1 may be 10 μm or more in order to stably manufacture a high-quality waveguide. In order to reduce NA1, it is desirable that the divergence angle NA0 of the light emitting element 30 (e.g., VCSEL) is small. In a VCSEL that operates at a high speed, the size of the light confinement portion inside the element is relatively small, and NA0 may be 0.2 to 0.25. Hence, NA1 may not be reduced without limitation. For the manufacturing reasons like this, a may be 0.01 or more and may be, for example, 0.01≤a≤0.15 or 0.01≤a≤0.11.

Figure 12:
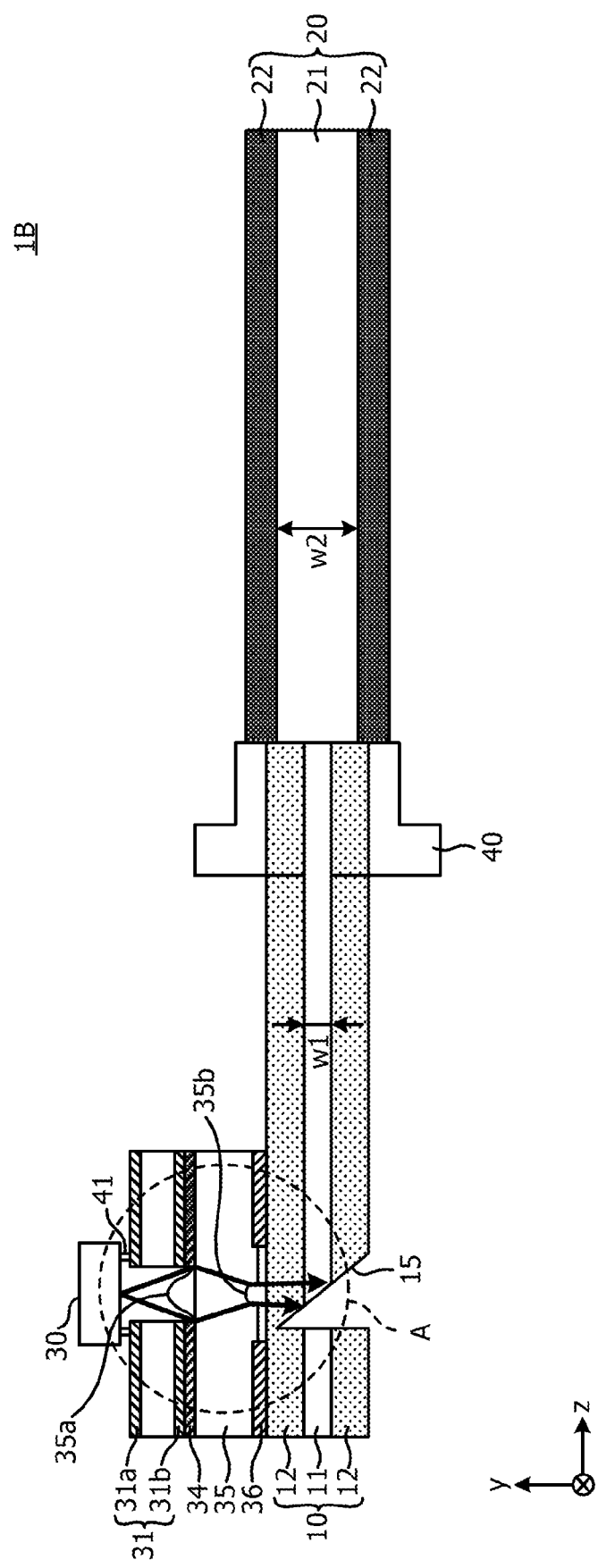
FIG. 12 illustrates an exemplary optical module.

FIG. 12 illustrates an exemplary optical module. In the configuration illustrated in FIG. 12, a concave lens 35b is formed on the rear side of the lens sheet 35. By providing the concave lens 35b, the mode dispersion may be further reduced. In order to reduce the optical system performance index a, it is effective to reduce the aperture angle NA1 of the light incident into the optical waveguide 10. When there is provided only one lens 35 as in FIG. 1, NA1 may meet Equation (3). As illustrated in FIG. 12, when the light emitting element 30 side (top side) of the lens sheet 35 is formed as the convex lens 35a, the optical waveguide 10 side (bottom side) of the lens sheet 35 is formed as the concave lens 35b, and the curvature of the concave lens 35b is set to be smaller than the curvature of the convex lens 35a, NA1 may be smaller than Equation (3). The light condensed by the lens 35a is converted into nearly parallel light beams in the concave lens 35b to be incident into the core 11 at the small NA1.

In the configuration illustrated in FIG. 12 as well, the ranges for the optical system performance index a and the ratio R of the core diameters are the ranges represented in FIGS. 10 and 11. The lens 35a and the lens 35b may be fabricated by performing a pressure-transfer to a lens film at a high temperature by using, for example, a mold, or by performing UV curing by using a UV curing material. Two molds may be used so that the molds may be transferred to the opposite sides of the lens film at the same time, or a lens may be formed on one side of a lens film, and thereafter, another lens may be transferred to the rear side of the lens film.

Figure 13:
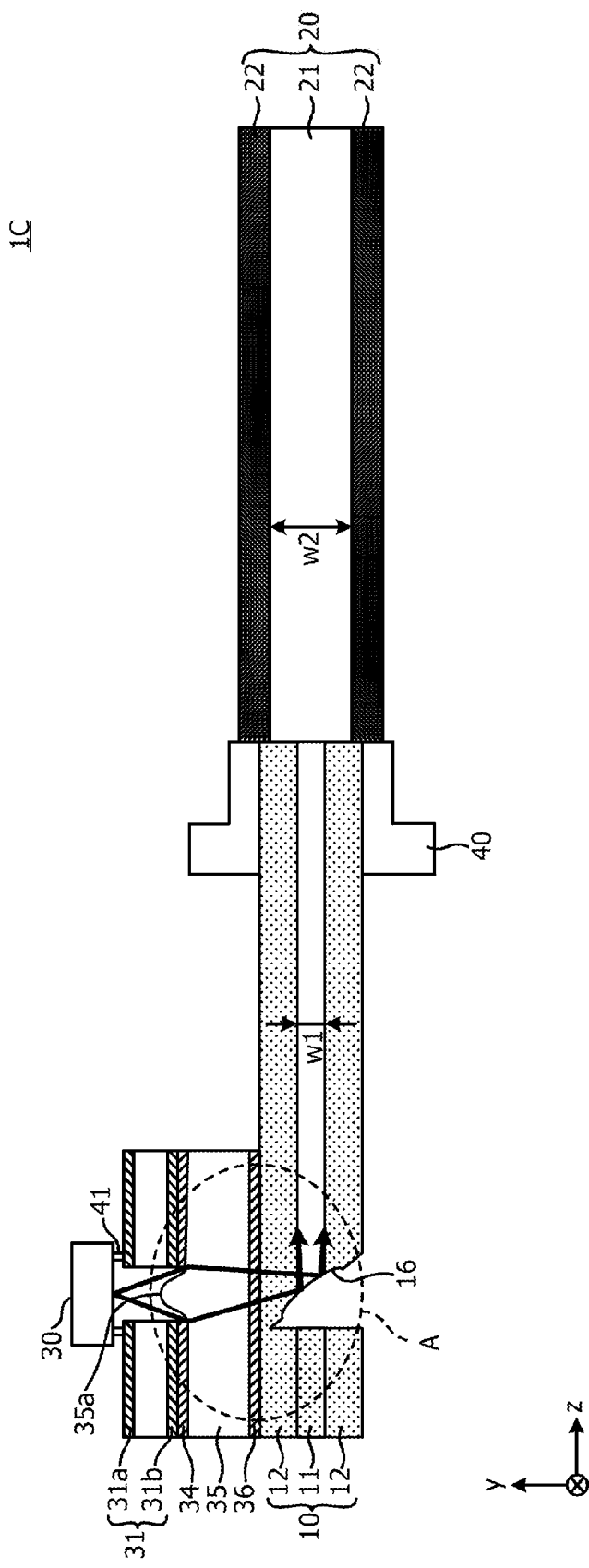
FIG. 13 illustrates an exemplary optical module.

FIG. 13 illustrates an exemplary optical module. In FIG. 13, a concave mirror 16 is provided in place of the concave lens 35b of FIG. 12. The concave mirror 16 is formed by processing the mirror surface of the mirror 15 of FIG. 1, which has the inclination angle of 45 degrees, into a concave surface, and substantially the same effect as the effect obtained by providing the concave lens 35b is obtained. The 45 degree mirror is formed by cutting the polymer waveguide with a dicing saw. The concave mirror 16 is formed by performing a mirror processing by laser ablation.

Figure 14:
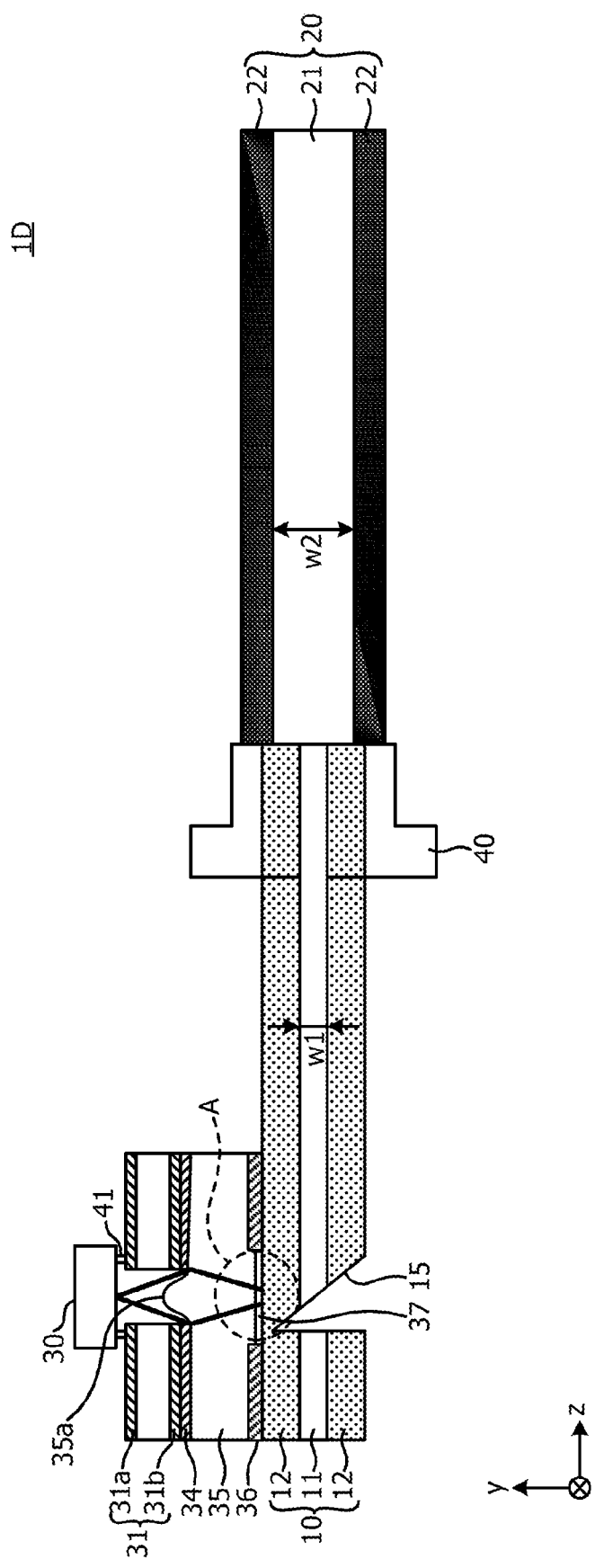
FIG. 14 illustrates an exemplary optical module.

FIG. 14 illustrates an exemplary optical module. In the optical module 1D, a low refractive index layer 37 is inserted between the rear side of the lens sheet 35 and the optical waveguide 10. In this method, NA1 may be easily reduced compared to the case in which the additional concave lens 35b is inserted between the light emitting element 30 and the optical waveguide 10. The low refractive index layer 37 is an adhesive layer having a refractive index smaller than, for example, 1.5. In order to reduce the loss resulting from, for example, a Fresnel reflection, a transparent adhesive filled between the lens sheet 35 and the optical waveguide 10 may be used as the refractive index layer 37. The refractive index lay 37 may be an air layer.

Figure 15:
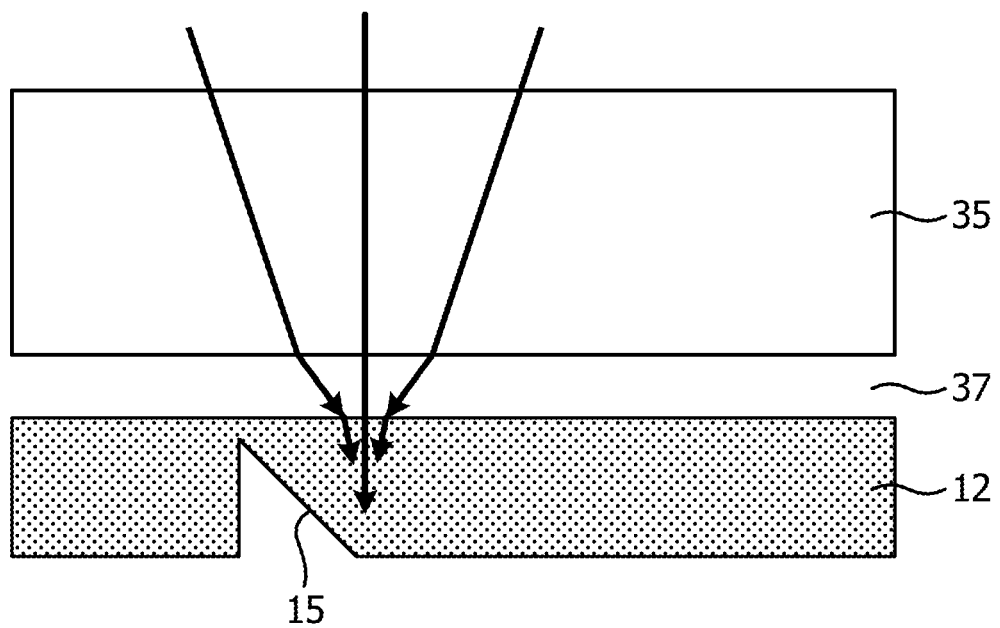
FIG. 15 illustrates exemplary light that is incident into an optical waveguide from a lens sheet via a low refractive index layer.

FIG. 15 illustrates exemplary light that is incident into the optical waveguide via the low refractive index layer from the lens sheet. FIG. 15 represents the refraction on the interface of the low refraction index layer 37. Each of the lens sheet 35 and the optical waveguide 10, of which the materials may be different from each other, is formed of a polymer material, and has a refractive indexes of about 1.5. When a low refractive index layer (e.g., the air layer 37) is inserted between the rear side of the lens sheet 35 and the optical waveguide 10, the light beam is refracted as represented in FIG. 15, and the condensing spot is reduced at the same NA1. Conversely, when the condensing spot is made to be as large as the core diameter of the optical waveguide 10, NA1 is reduced, and substantially the similar effect to that obtained when the concave lens 35b is inserted may be obtained.

Figure 16:
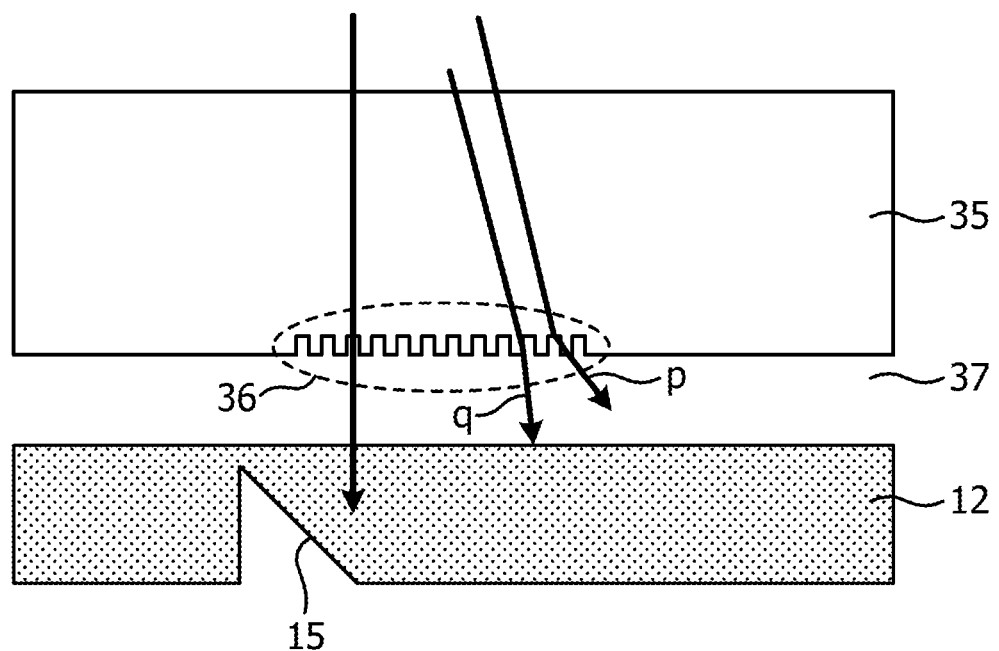
FIG. 16 illustrates exemplary light that is incident into an optical waveguide from a lens sheet via a low refractive index layer.

FIG. 16 illustrates exemplary light that is incident into the optical waveguide from the lens sheet via the low refraction index layer. The low refraction index layer 37 is filled between the lens sheet 35 and the optical waveguide 10 as in FIG. 14, and micro-scale irregularities 36 are formed on the interface between the lens sheet 35 and the low refraction index layer 37. In the irregularities 36, a straightly incident light beam straightly passes, and an angled light beam q changes (scatters) in its angle. Although a partial component of the incident light such as, for example, the light beam p may not be connected into the optical waveguide 10, the aperture angle NA1 of the incident light is reduced on average. Accordingly, substantially the same effect as that in FIGS. 12 to 14 may not be obtained.

The foregoing exemplary embodiments may be arbitrarily combined with each other. For example, the insertion of the low refraction index layer 37 and the concave mirror 16 may be combined with each other.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An optical module comprising:
   a light emitting element;
   an optical waveguide configured to guide light emitted from the light emitting element; and
   an optical fiber configured to be optically coupled to the optical waveguide,
   wherein, when an aperture angle of light incident into a core of the optical waveguide is NA1, a core diameter of the optical waveguide is w1, a core diameter of the optical fiber is w2, and a ratio of w1 to w2 is R,
   an optical system performance index a represented by $a = NA1 \times (w1/w2) = NA1 \times R$ meets a condition of $a < 0.15$, and the range of the ratio R meets a condition of $4.38a^2 + 1.63a + 0.16 < R < -13.09a2 - 1.04a + 0.95$.

2. The optical module according to claim 1, wherein the optical system performance index a meets a condition of $a < 0.11$, and the range of the ratio R meets a condition of $17.57a^2 + 1.17a + 0.17 < R < -8.68a^2 - 2.59a + 0.92$.

3. The optical module according to claim 2, wherein the ratio R is $R = 156.43a^3 - 65.71a^2 + 8.28a + 0.21 \pm 0.01$.

4. The optical module according to claim 1, further comprising:
   a first lens provided between the light emitting element and the optical waveguide,
   wherein, when an aperture angle of light emitted from the light emitting element is NA0, and a light emission diameter is w0, the first lens is designed to meet a condition of $NA1 = NA0 \times w0/w1$.

5. The optical module according to claim 4, further comprising:
   a second lens provided between the first lens and the waveguide,
   wherein the first lens is a convex lens, the second lens is a concave lens, and a curvature of the concave lens is smaller than a curvature of the convex lens.

6. The optical module according to claim 4, wherein the first lens is a convex lens formed on a first surface of a lens sheet that faces the light emitting element, the lens sheet inserted between the light emitting element and the optical waveguide.

7. The optical module according to claim 6, further comprising:
   a concave lens formed on a second surface of the lens sheet that is opposite to the first surface,
   wherein a curvature of the concave lens is smaller than a curvature of the convex lens.

8. The optical module according to claim 6, further comprising:
   a low refractive index layer that is inserted between the lens sheet and the optical waveguide, the low refractive index layer having a lower refractive index than refractive indexes of the lens sheet and the optical waveguide.

9. The optical module according to claim 8, wherein an irregular pattern is formed on an interface between the lens sheet and the low refractive index layer.

10. The optical module according to claim 1, wherein the optical waveguide has a first surface facing an emission surface of the light emitting element and a second surface opposite to the first surface, and the second surface includes a mirror to guide the light emitted from the light emitting element into the core of the optical waveguide.

11. The optical module according to claim 10, wherein the mirror has a mirror surface inclined 45 degrees with respect to the first surface.

12. The optical module according to claim 10, wherein the mirror is a concave mirror formed on an inclined surface inclined 45 degrees with respect to the first surface.

13. The optical module according to claim 1, wherein the optical waveguide has a step index type refractive index distribution.

14. The optical module according to claim 1, wherein the optical fiber has a graded index type refractive distribution.

\* \* \* \* \*